April 27, 1943.   L. D. DONBECK ET AL   2,317,742
CONVEYER ROLLER
Filed Dec. 22, 1939
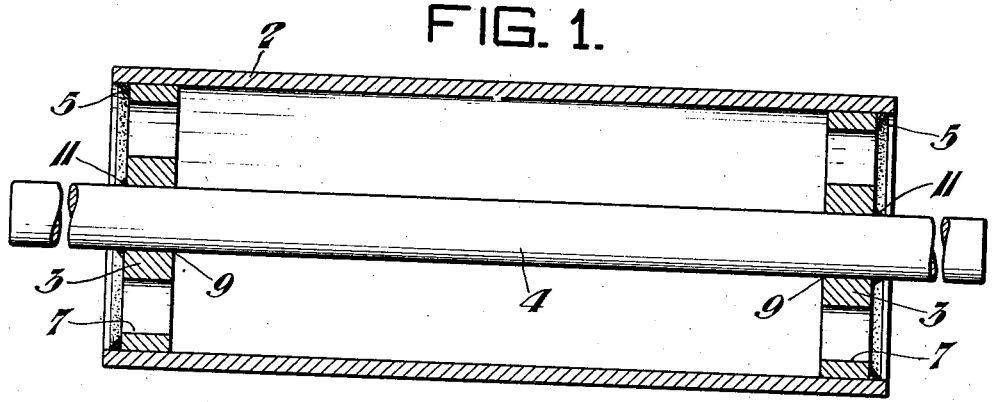
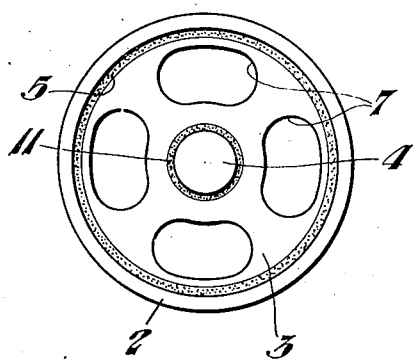 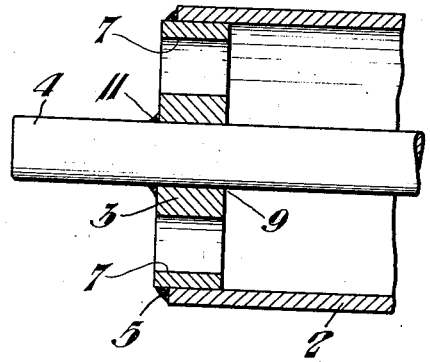
Inventors:
LARRY D. DONBECK and
ROBERT A. PETERSON,
by: John E. Jackson
their Attorney.

Patented Apr. 27, 1943

2,317,742

UNITED STATES PATENT OFFICE 2,317,742

CONVEYER ROLLER

Larry D. Donbeck and Robert A. Peterson, Gary, Ind.

Application December 22, 1939, Serial No. 310,617

2 Claims. (Cl. 193—37)

This invention relates to conveyer rollers such as are used in steel mills to transport various metallic objects.

In conveyer roller lines such as are used in steel mills, it is necessary that the transported medium be shielded from scratching or marring. It is also necessary that the wear and tear on the conveying equipment be minimized.

It is among the objects of the present invention to provide a hard polished roller having high resistance to wear.

Another object is the provision of a conveyer roller of the type described which has not only the foregoing characteristics, but also those of lightness and low cost of manufacture.

The foregoing and other objects will be apparent after referring to the drawing, in which:

Figure 1 is a sectional elevation of the conveyer roller of the present invention;

Figure 2 is an end view; and

Figure 3 is a fragmentary sectional elevation of a modification.

In accordance with the present invention, the body 2 of the roller is made of standard tubing of suitable diameter and length. The hub plates 3 are circular in shape and of a diameter which is comparable to the inside diameter of the body 2 with sufficient clearance to facilitate easy insertion into the roller assembly. The shaft 4 is inserted through the hub plates 3 and body 2 after these elements have been heat-treated, as will appear more fully hereinafter.

The hub plates 3 are positioned in the body 2 and electrically spot welded in place, low carbon welding rods being used. The welds bond the hub plates to the roller completely around its periphery, as shown at 5. This feature is important for it gives equal and uniform support to the roller body throughout its entire inner circumference, thereby minimizing the liability of distortion and strain in the subsequent carburizing and heat-treatment.

In Figure 1 the hub plates 3 are shown as secured fully within the body 2 of the roller; while according to Figure 3 the said hub plates extend slightly from the body 2.

After the hub plates 3 are welded in place to form an assembly, four holes 7 of suitable size (depending on the size of the roller) are layed-out on the hub plates an equal distance apart and with their centers equi-distant from the geometric center of the hub plates. These holes 7 are then burned out with acetylene torch.

The holes 7 are of great importance, for they make possible free and lowered resistance to the flow of quenching media (water) into the inner chamber of the roller body, thereby establishing a more uniform rate of cooling of the entire roller during the quenching operations.

The roller body face or surface is now turned down in lathe, concentric to common center of the roller. This operation requires only light cuts, sufficient to clean up the surface and produce a smooth finish. In addition to producing a smooth surface condition, this turning operation is necessary for with the general run of tubing, there is a tendency for its being out of round.

After the turning operation is completed, the roller is again supported in lathe chuck and center rest, centered, and the shaft hole 9 is drilled in each hub plate. The roller is now ready for the carburizing and heat-treatment.

Before proceeding with a description of the carburizing and heat-treatment, it should be stated that they are applicable to, and the objects of the invention obtained on, any tube 2 which is composed of tubing, skelp, plate, strip or casting, the desired structural and physical characteristics of which can only be secured by carburizing and heat-treatment. A specific example may comprise carbon, 0.17%, manganese, 0.46%, phosphorus, 0.010%, sulphur, 0.027% and silicon 0.008%; but the teachings of the invention are applicable to approximately the following range of analysis:

| | |
|---|---|
| Carbon | 0.08% to 0.35% |
| Manganese | 0.35% to 0.90% |
| Phosphorus | Minimum |
| Sulphur | Do |
| Silicon | Do |

The carburizing compound used is solid, containing suitable carbonaceous materials, some animal matter and barium carbonate as an energizer. Barium carbonate disassociates at high temperatures and gives off carbon dioxide ($CO_2$) gas, which combines with the carbonaceous materials to form carbon monoxide ($2CO$) gas, which is essential to this type of carburizing practice. After being used, the carburizing compound is spread out in such fashion as to permit maximum exposure to the atmosphere; thus enabling the barium carbonate to revitalize itself by absorption of carbon dioxide. It will be understood by those skilled in the art that any other solid carburizing compound may be used instead of that described immediately hereinbefore.

According further to the teachings of the invention, the roller 2 and transfer hub plates 3 are packed in the solid carburizing compound in any suitable container, in the manner well known to those skilled in the art. Any carburizing process or practice has for its object the impregnation of surfaces of objects made of low carbon steel with additional carbon which will enable said parts to be hardened when heated to their definite critical temperatures and quenched.

In order to produce a fine polished surface, the rollers are ground to a mirror-like finish, and it is obvious that any degree of distortion accruing from the carburizing would represent the amount of the valuable serviceable "case" which would be ground away in the finishing operation. Accordingly, the elimination or practical elimination of distortion is desired.

The carburizing containers are preferably of such dimension that approximately 4 inches of carburizing compound cover the ends of the roller assemblies, which are vertically disposed, and approximately 2½ to 3 inches of carburizing compound surround the surface of the rollers. In addition, the inner chamber of each of the rollers is packed with carburizing compound; the entire space being filled. This minimizes the tendency of the roller to warp in the process of carburizing and hardening.

In view of the nature of the service to be encountered by the rollers, it is necessary to obtain a fairly deep carburized case of uniform depth on inner and outer surfaces of the roller body.

After the rollers have been disposed in the container and the container placed in the furnace, the temperature is slowly but uniformly raised. The rate of heating is controlled to avoid a large differential in temperature between the furnace chamber and the rollers. In the lower brackets (i. e. 200 degrees Fahrenheit–250 degrees Fahrenheit) this is permissible; but after the charge and furnace approach the desired carburizing temperatures, this differential is reduced.

Applicants have found that a temperature of 1700 degrees Fahrenheit and 1725 degrees Fahrenheit for a period of about 16 hours produces a case depth of approximately $\frac{5}{32}$ of an inch. In this instance, with the carbon contents ranging from .95 to 1.00%, the hypereutectoid zone of case is rather extensive. The rollers are then cooled in the furnace to approximately 800 degrees Fahrenheit, after which the container is removed.

By allowing the rollers to cool down slowly from the carburizing temperature through the A. R. 3-2-1 points (lower critical temperature) of case, a more efficient diffusion of the carbides is obtained, thereby avoiding abrupt demarcation. This is an important feature, as it minimizes the potential danger of "spawling" and "quenching strain" during the hardening treatment.

After carburizing, the rollers are taken from the containers and quenched after being reheated to approximately 1500 degrees Fahrenheit. After the rollers are quenched, they are removed from the quenching vessel and the shafts 4 inserted in place. These shafts are then electrically spot welded completely around their circumference, as shown at 11, to the hub plates 3.

After the shafts have been installed, the rollers are ground with any suitable abrasive medium to the desired degree of finish.

While we have shown and described certain specific embodiments of the present invention, it will be seen that we do not wish to be limited exactly thereto, since various modifications may be made without departing from the scope of the invention, as defined by the following claims.

We claim:

1. A conveyer roller for conveying metallic articles comprising a carburized and quenched tube of steel which, before carburizing and quenching, included approximately .08% to .35% carbon and .35% to .90% manganese and a metallic supporting element affixed to each end of said carburized and quenched tube, the resultant surface and hardness of the tube being such as to substantially increase wear resistance of the tube, and to substantially eliminate scratching and marring of the article passing thereover.

2. A polished conveyer roller for conveying metallic articles comprising a carburized and quenched tube of steel which, before carburizing and quenching, included approximately .17% carbon and .46% manganese and a metallic supporting element affixed to each end of said carburized and quenched tube, the resultant surface and hardness of the tube being such as to substantially increase wear resistance of the tube, and to substantially eliminate scratching and marring of the article passing thereover.

LARRY D. DONBECK.
ROBERT A. PETERSON.